US012343854B2

(12) United States Patent
Kreischer et al.

(10) Patent No.: US 12,343,854 B2
(45) Date of Patent: Jul. 1, 2025

(54) HAND-HELD PULLING AND COMPRESSING DEVICE

(71) Applicant: TKR SPEZIALWERKZEUGE GmbH, Gevelsberg (DE)

(72) Inventors: Torsten Kreischer, Wetter (DE); Thorsten Weyland, Herdecke (DE)

(73) Assignee: TKR SPEZIALWERKZEUGE GMBH, Gevelsberg (DE)

( * ) Notice: Subject to any disclaimer, the term of this patent is extended or adjusted under 35 U.S.C. 154(b) by 0 days.

(21) Appl. No.: 18/412,371

(22) Filed: Jan. 12, 2024

(65) Prior Publication Data

US 2024/0238960 A1 Jul. 18, 2024

(30) Foreign Application Priority Data

Jan. 16, 2023 (EP) .................................... 23151823

(51) Int. Cl.

| | |
|---|---|
| ***B25F 3/00*** | (2006.01) |
| ***B21J 15/10*** | (2006.01) |
| ***B21J 15/26*** | (2006.01) |

(52) U.S. Cl.

CPC ............... *B25F 3/00* (2013.01); *B21J 15/105* (2013.01); *B21J 15/26* (2013.01)

(58) Field of Classification Search

CPC ............... B25F 3/00; B21J 15/105; B21J 5/26

See application file for complete search history.

(56) References Cited

U.S. PATENT DOCUMENTS

| | | | | |
|---|---|---|---|---|
| 10,312,653 B2 * | 6/2019 | Ballard | .............. | H01R 43/0427 |
| 11,759,937 B1 * | 9/2023 | Chuan | ..................... | B25F 5/005 91/287 |
| 2005/0120770 A1 * | 6/2005 | Frenken | .................... | B25F 5/02 72/453.16 |
| 2007/0214861 A1 * | 9/2007 | Lefavour | ................ | F16K 17/34 72/453.16 |
| 2010/0202842 A1 * | 8/2010 | Whitehead | ................ | B25F 3/00 408/139 |

(Continued)

FOREIGN PATENT DOCUMENTS

| | | | |
|---|---|---|---|
| CN | 201619097 U * | 11/2010 | ................ B25F 3/00 |
| CN | 203430470 U * | 2/2014 | |

(Continued)

*Primary Examiner* — Lucas E. A. Palmer

(74) *Attorney, Agent, or Firm* — ICE MILLER LLP; Justin D. Swindells

(57) ABSTRACT

The invention relates to a hand-held pulling and compressing device for driving interchangeable tools, with

Figure 1:
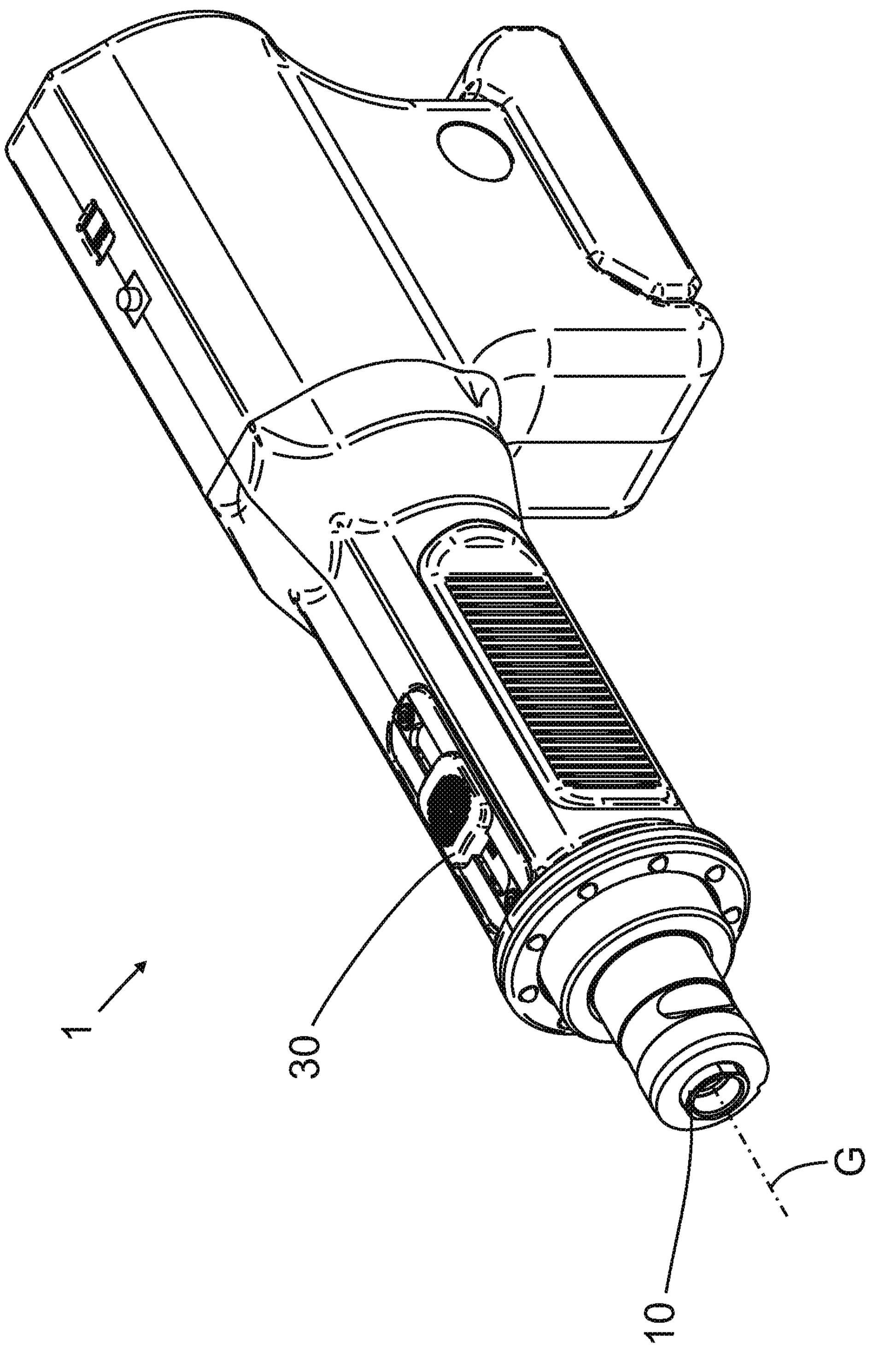

- a drive unit with a battery operated electric motor,
- a screw drive with a threaded spindle connected to the electric motor and mounted rotatably on a housing body and a threaded nut mounted rotatably on the threaded spindle and non-rotatably on the housing body via a bearing unit, and
- a coupling unit connected to a first tool holder for transmitting tensile and compressive forces resulting from the direction of rotation of the threaded spindle from the threaded nut to the first tool holder.

In order to provide a hand-held pulling and compressing device that is reliably and flexibly suitable for driving interchangeable tools, it is provided that the screw drive is designed to transmit rotational movements of the threaded spindle to a second tool holder.

12 Claims, 4 Drawing Sheets

(56) References Cited

U.S. PATENT DOCUMENTS

| | | | | |
|---|---|---|---|---|
| 2014/0182874 | A1* | 7/2014 | Barezzani | B25B 27/10 173/217 |
| 2016/0023289 | A1* | 1/2016 | Moss | B25F 3/00 30/500 |
| 2016/0271781 | A1* | 9/2016 | Kobayashi | F16H 25/20 |
| 2017/0252912 | A1* | 9/2017 | Barezzani | B23D 15/14 |
| 2019/0232481 | A1* | 8/2019 | Skinner | B25B 27/10 |
| 2020/0254600 | A1* | 8/2020 | Kamijo | H01R 43/0427 |
| 2020/0298388 | A1* | 9/2020 | Norquist | B25F 5/005 |
| 2021/0394253 | A1* | 12/2021 | Yabunaka | B21J 15/105 |
| 2023/0302621 | A1* | 9/2023 | Kamijo | B25F 5/005 |

FOREIGN PATENT DOCUMENTS

| | | | | | |
|---|---|---|---|---|---|
| CN | 104308790 | A | * | 1/2015 | B21J 15/24 |
| DE | 3910083 | A1 | | 10/1989 | |
| DE | 202012012292 | U1 | | 6/2014 | |
| DE | 102021115744 | A1 | | 12/2021 | |
| EP | 1658907 | A1 | * | 5/2006 | B21D 1/12 |
| GB | 2218268 | A | | 11/1989 | |
| WO | WO-2004039569 | A1 | * | 5/2004 | B30B 1/18 |

* cited by examiner

HAND-HELD PULLING AND COMPRESSING DEVICE

CROSS-REFERENCE TO RELATED APPLICATION

This application is a convention priority application which claims priority to European patent application 23151823.4 filed Jan. 16, 2023, the disclosure of which is incorporated herein by reference in its entirety.

The invention relates to a hand-held pulling and compressing device for driving interchangeable tools, with a drive unit with a battery operated electric motor, a screw drive with a threaded spindle connected to the electric motor and mounted rotatably on a housing body and a threaded nut mounted rotatably on the threaded spindle and non-rotatably on the housing body via a bearing unit, and a coupling unit connected to a first tool holder for transmitting tensile and compressive forces resulting from the direction of rotation of the threaded spindle from the threaded nut to the first tool holder.

Hand-held pulling and compressing devices, i.e. devices that can be used mobile by one person, such as hand-held, electric riveting and pressing devices for setting blind rivet elements, such as blind rivets and blind rivet nuts, or for carrying out punching processes and for setting punch rivets, which have a drive unit with an electric motor-driven threaded spindle of a screw drive, are known from the prior art in a variety of embodiments. The screw drive converts a rotational movement of the electric motor into a linear movement of the pulling and pressing tool in a known manner. In the case of the setting process of a blind rivet element, for example, a mandrel of the blind rivet element is moved axially.

The riveting and compressing devices described above are used, for example, in vehicle workshops to carry out repair work on the bodywork of vehicles and for maintenance work on tube or cable connections. Depending on the work to be carried out, it is necessary to drive a wide range of different interchangeable tools with the riveting and compressing devices. Even known hand-held devices that enable the operation of both pulling and pressing tools have the disadvantage of limited connection and/or drive options for interchangeable tools.

Based on this, the invention is based on the object of providing a hand-held pulling and compressing device which is reliably and flexibly suitable for driving interchangeable tools.

The invention solves the object by a hand-held pulling and compressing device with the features of claim 1. Advantageous further embodiments of the invention are given in the dependent claims.

The screw drive of the hand-held pulling and compressing device according to the invention is designed to transmit rotational movements of the threaded spindle to a second tool holder.

The hand-held pulling and compressing device according to the invention is connected via a coupling unit to a first tool holder, which is designed to interchangeably hold different pulling and pressing tools required for the respective application. For example, when used as a compressing device, the first tool holder can be designed to hold a riveter, which is used in conjunction with a rivet clamp arranged on the compressing device for setting rivets. When used as a pulling device, the first tool holder can, for example, be provided with suitable clamping devices for a blind rivet shank or have other means for transmitting tensile forces. Alternatively or additionally, the first tool holder can also be designed to hold corresponding pulling tools, whereby the pulling tools have, for example, clamping means by means of which the tensile forces can then be transmitted.

The coupling unit is also connected to the threaded nut in such a way that both tensile and compressive forces resulting from the direction of movement of the threaded spindle and the resulting linear adjustment of the threaded nut are reliably transmitted to the coupling unit.

The screw drive, in particular the threaded spindle, is designed in such a way that the rotational movement of the threaded spindle and/or the torque of the electric motor can be transmitted to the second tool holder. Preferably, tools arranged on the second tool holder can be connected to the second tool holder in such a way that the tools are rotated as a function of the rotational movement transmitted by the electric motor to the threaded spindle.

The hand-held pulling and compressing device according to the invention makes it possible, depending on the work to be carried out, for example in the context of its use in a vehicle workshop when carrying out bodywork, to arrange a tool required for the respective operation on the first tool holder. The hand-held pulling and compressing device thus allows both pulling and pressing work to be carried out, e.g. setting blind rivets or carrying out punching work. The linear adjustment of the selected tool required for the respective operation is reliably transmitted to the first tool holder via the coupling unit, since the coupling unit transmits both tensile and compressive forces from the threaded nut to the respective tool in accordance with the invention. For the pulling or pressing work, the tool holder is preferably moved continuously and particularly preferably without abrupt changes of direction in the direction of the longitudinal axis of the threaded spindle by means of the tensile and compressive forces.

Furthermore, the design of the screw drive according to the invention for transmitting rotational movements of the threaded spindle to the second tool holder enables not only pulling and pressing work to be carried out but also rotational work, whereby, for example, a blind rivet nut can be set using the rotational movement of the second tool holder and a rotary tool arranged therein. The arrangement of the first tool holder on the coupling unit or the second tool holder on the screw drive optionally allows the transmission of tensile and compressive forces or torques and/or rotational movements to a tool. This means that the hand-held pulling and compressing device can be used reliably and flexibly to drive different interchangeable tools.

The design of the screw drive for converting the rotational movement of the electric motor into a linear movement of the threaded nut and thus of the pulling and pressing tool in operative connection with the threaded nut is basically freely selectable. The screw drive is preferably designed in such a way that a tensile or compressive force of 1-7 tons, preferably 2-6 tons, acts on the coupling unit and/or the first tool holder.

Preferably, the threaded spindle has an outer diameter of 10-30 mm, preferably 12-25 mm, particularly preferably 14-22 mm, which advantageously enables a particularly compact screw drive. For example, trapezoidal threaded spindles can be used, the thread pitch of which can usually be selected in the range of 2 to 10 mm according to the forces to be achieved.

It is particularly preferred that the screw drive is designed as a ball screw drive or planetary screw drive. The use of such screw drives with balls or rollers as rolling elements is characterized by the fact that, in contrast to trapezoidal screw drives, in which surfaces rub against each other, they have a particularly high degree of efficiency, which makes it possible to reduce the dimensions of the electric motor in order to achieve the desired tensile forces or compressing pressures, so that the hand-held pulling and compressing device can be designed to be particularly compact. Typical thread pitches of ball screw drives or planetary screw drives are 5 to 10 mm. Preferably, the threaded spindle has a pitch of 2-8 mm, more preferably 3-7 mm, most preferably 4-6 mm.

The design of the hand-held pulling and compressing device according to the invention provides that the first tool holder is operatively connected to the threaded nut in such a way that tensile and compressive forces resulting from the direction of rotation of the threaded spindle are transmitted to the first tool holder. The design of the coupling unit with the threaded nut required for this is basically freely selectable.

According to an advantageous further development of the invention, it is provided that the pulling and compressing device has a connecting element for transmitting tensile and compressive forces from the threaded nut to the coupling unit, wherein the connecting element is operatively connected to a first end face of the threaded nut via a first connecting section and to the coupling unit via a second connecting section. The connecting sections of the connecting element are arranged at a distance from one another in the longitudinal axis direction of the threaded spindle. The threaded nut has the first and a second end face, which are aligned essentially perpendicular to the longitudinal axis direction of the threaded spindle and thus to the adjustment direction of the threaded nut.

To secure the connecting element in its position relative to the threaded nut, it is preferably designed in such a way that the connecting sections are connected to each other when viewed in the longitudinal axis direction of the threaded spindle. The connecting element is particularly preferably designed as a single piece and/or in one piece. The connection of the connecting sections to each other ensures mutual transmission of the forces acting on the connecting sections by the threaded nut depending on its direction of adjustment. Due to the operative connection of the second connecting section with the coupling unit, it is also ensured that the coupling unit is fixed in relation to the threaded nut.

Forces acting in the direction of the coupling unit due to a correspondingly directed displacement of the threaded nut lead to compressive forces between the threaded nut and the coupling unit, which are transmitted to the first tool holder via the coupling unit. If the threaded nut moves in the opposite direction, the compressive forces acting on the first connecting section of the connecting element and generated by the threaded nut are transmitted to the coupling unit via the second connecting section of the connecting element, so that tensile forces are transmitted to the first tool holder in a corresponding manner via the coupling unit.

The use of a connecting element according to the advantageous further development of the invention described above ensures in a particularly reliable manner that both tensile and compressive forces are reliably transmitted from the threaded nut to the first tool holder. In addition, the one-piece and/or one-piece connecting element enables a more compact and stable design compared to a multi-piece adapter unit with two inter-connected connecting elements. According to an advantageous embodiment of the invention, it is provided that the first connecting section of the connecting element bears against the first end face of the threaded nut and the second connecting section projects beyond a second end face of the threaded nut in the longitudinal axis direction of the threaded spindle and engages with a coupling section of the coupling unit, as a result of which the coupling unit bears against the second end face of the threaded nut.

According to this embodiment of the invention, the connecting element, together with the coupling unit engaged with the second connecting section, forms a cage-like body which encloses the threaded nut. The first connecting section, which bears against the first end face, and the second connecting section, which engages with the coupling section of the coupling unit, reliably ensure that tensile and compressive forces are transmitted from the threaded nut via the coupling unit to the first tool holder.

Preferably, the first connecting section is designed as a projection extending in a radial direction to the longitudinal axis of the threaded spindle. The two connecting sections of the connecting element are also preferably connected to each other via a sleeve section extending in the longitudinal axis direction of the threaded spindle and enclosing the threaded nut. The second connecting section is preferably formed as an internal thread and is in engagement with the coupling section of the coupling unit, which is particularly preferably formed as an external thread.

In the case of compressive forces resulting from a movement of the threaded nut in the direction of the coupling unit, these are transmitted directly to the coupling unit due to the contact of the coupling unit with the second end face of the threaded nut. A movement of the threaded nut in the opposite direction to the coupling unit results in tensile forces, which result from a conversion of the compressive forces acting on the first connecting section of the connecting element and are transmitted to the second connecting section of the connecting element via the sleeve section. The coupling unit bears against the second end face of the threaded nut. Due to the advantageous design of the connecting element, a reliable conversion of the compressive forces acting on the first connecting section into the tensile forces acting on the coupling unit engaged with the second connecting section via the coupling section is ensured in a simple manner.

According to an advantageous further development of the invention, it is provided that the coupling unit is designed in such a way that the second tool holder can be connected to the threaded spindle. The coupling unit is preferably designed such that the second tool holder can be arranged on and connected to the threaded spindle without removing the coupling unit. It is particularly preferred that the coupling unit has a sleeve-like design. Here, the term sleeve-like is understood to mean that the coupling unit has a free area extending in the longitudinal axis direction of the threaded spindle for the second tool holder to pass through, for example in the form of a through opening. Due to the advantageous design of the coupling unit, the second tool holder can be quickly and easily arranged on the threaded spindle and connected to it to transmit the rotational movements.

According to an advantageous embodiment of the invention, it is provided that the coupling unit is connected to the threaded nut in a non-rotatable manner. This embodiment of the invention makes it possible to dispense with a possibly provided non-rotatable arrangement of the coupling unit on the housing body, since the coupling unit is subsequently also arranged non-rotatably on the housing body via the non-rotatable connection of the threaded nut to the housing body provided according to the invention. The bearing unit provided for the non-rotatable arrangement of the threaded nut can in principle be designed in any way. It is conceivable here, for example, that the bearing unit is formed by a feather key embedded in the threaded nut, which is mounted in a corresponding guide rail on the housing body.

According to an advantageous further development of the invention, it is provided that the bearing unit is designed in such a way that the threaded nut and/or the coupling unit connected to the threaded nut in a non-rotable manner are supported on the housing body in a rolling manner. According to this embodiment of the invention, the bearing unit has at least one rolling element via which the threaded nut is supported in a rolling manner relative to the housing body. This embodiment of the invention ensures in-creased efficiency, since losses due to friction are reduced. In addition, the use of an appropriately further developed bearing unit provides a particularly simple backlash-free bearing of the threaded nut, so that tensile and compressive forces are reliably transmitted.

The specific design of the bearing unit for the rolling support of the coupling unit on the housing body, whereby suitable rolling elements are usually used for this purpose, is basically freely selectable. For example, the bearing unit has a bearing roller arranged rotatably on a bearing journal projecting radially from the threaded nut or the coupling unit and supported circumferentially on two opposite sections of the housing body, or two bearing rollers each arranged rotatably on a bearing journal projecting radially from the threaded nut or the coupling unit and each bearing against one of two opposite sections of the housing body on the circumferential side.

According to the above embodiment of the invention, the bearing unit has one or two bearing rollers which are rotatably arranged on bearing journals which project from the threaded nut or coupling unit perpendicular to the direction of adjustment. If a single bearing roller is used, it is supported on the housing body by two sections arranged opposite each other perpendicular to the direction of adjustment of the threaded nut, whereby the bearing roller rolls along the opposite housing body sections when the threaded nut is adjusted along the longitudinal axis direction of the threaded spindle.

In the case of the advantageously provided use of two bearing rollers, the threaded nut or the coupling unit have two bearing journals projecting from the threaded nut or the coupling unit perpendicular to the direction of adjustment of the threaded nut, on each of which a bearing roller is rotatably arranged. The two bearing rollers are each supported by an area on the housing body, whereby the support areas are arranged opposite each other on the housing body, viewed perpendicular to the direction of adjustment of the threaded nut, so that reliable support is also achieved in this way when the threaded nut is adjusted, in which the bearing rollers each roll on the housing body.

The design of the housing body for supporting the bearing unit is basically freely selectable. However, it is particularly preferable that the housing base body is designed as a single piece and has a guide to support the bearing roller. In this case, the two sections of the housing base body are preferably formed as supporting surfaces of the guide. The guide extends in the longitudinal axis direction of the threaded spindle and is formed, for example, as an elongated hole, with the supporting surfaces being formed as the inner surfaces of the elongated hole. For example, the housing base body is made of a metal material, e.g. an aluminum material.

The design of the coupling unit for connection to the first tool holder or the design of the threaded spindle for connection to the second tool holder are basically freely selectable. For example, the coupling unit and the first tool holder can also be designed in one piece. To arrange the second tool holder, for example, the coupling unit together with the first tool holder is removed from the housing base body of the hand-held pulling and compressing device and/or removed from the threaded nut. Alternatively or additionally, the threaded spindle and the second tool holder are formed in one piece. According to an advantageous further development of the invention, however, it is provided that the first tool holder is designed for detachable connection to the coupling unit and/or the second tool holder is designed for detachable connection to the threaded spindle. This design of the coupling unit and the threaded spindle makes it possible to arrange adapted first or second tool holders on the coupling unit or the threaded spindle in a simple and particularly flexible manner, depending on the work to be carried out. This allows the use of standardized pulling and pressing tools as well as rotary tools and increases the range of application of the pulling and compressing device in a complementary manner.

The design for the detachable connection of the threaded spindle and/or the second tool holder is basically freely selectable. For example, the second tool holder is connected in a force-fitting manner to the threaded spindle, e.g. by means of an additional connecting element. In this case, the connecting element, e.g. a screw, is removed from the threaded spindle to release the second tool holder. According to an advantageous embodiment of the invention, however, it is provided that the threaded spindle and/or the second tool holder are designed to form a positive fit in the circumferential direction of the threaded spindle. To form the positive fit, preferably at least one shaped section arranged on the threaded spindle or the second tool holder and at least one recess arranged on the second tool holder or the threaded spindle are provided for arranging the shaped section.

The shaped section and the recess are arranged in or at an angle to the longitudinal axis of the threaded spindle and/or particularly preferably each have a cross-section extending in the longitudinal axis direction of the threaded spindle. For example, the shaped section and the recess are designed and/or arranged on the threaded spindle or the second tool holder in such a way that the second tool holder is connected to the threaded spindle via a bayonet fitting between the shaped section and the recess. Preferably, the shaped section and/or the recess have a polygonal or elliptical cross-section for forming the positive fit in the circumferential direction. Due to the advantageous design of the threaded spindle and/or the second tool holder, additional connecting elements can be dispensed with. In addition, the advantageously provided positive fit enables a simple and quick connection of the threaded spindle to the second tool holder.

In principle, the rotational movement of the motor can be transmitted to the threaded spindle in any desired manner. According to an advantageous further development of the invention, it is provided that the drive unit has a gear connecting the electric motor and the threaded spindle. The use of a gear makes it possible to transmit high torques in a small installation space and weight.

For example, two- to three-stage planetary gears as well as cycloidal and spur gears are used as gears, which offer the desired ratios. Preferably, the speed of the electric motor and/or the transmission ratio of the gear and/or the pitch of the threaded spindle are set in such a way that the first tool holder connected to the threaded nut via the coupling unit is adjusted during operation at a feed speed of 700-8000 mm/min, preferably 1300-5100 rpm, particularly preferably 1900-3800 rpm, most preferably 2750 rpm. Preferably, the gear has a gear ratio of 1:70 to 1:30, preferably 1:60 to 1:40, particularly preferably 1:55 to 1:45, most preferably 1:50. The speed of the electric motor is preferably 25000-30000 rpm, preferably 26000-29000 rpm, particularly preferably 27000-28000 rpm, most preferably 27500 rpm. In combination with preferably provided brushless motors, which are battery operated, an optimal coordination between electric motor gear, threaded spindle and the resulting force can be achieved. Furthermore, the drive unit, in particular the electric motor and/or the gear, are formed in such a way that a torque of 10-100 Nm, preferably 15-95 N/m, most preferably 15-25 N/m and/or 75-95 N/m acts on the threaded spindle.

In the simplest embodiment of the hand-held pulling and compressing device according to the invention, the electric motor can be operated in such a way that only the direction of rotation of the threaded spindle can be selected. According to an advantageous embodiment of the invention, it is provided that the pulling and compressing device has a control unit connected to at least one sensor unit for controlling and/or archiving the operating processes.

According to this design, the use of a control unit allows a targeted control of the corresponding operating processes, for example pulling, pressing and/or rotational processes. For example, the control unit can be used to set the intended tensile or compressive forces in a particularly simple manner so that the operating processes can be carried out particularly reliably. The control unit can also be provided for archiving the operating processes carried out so that the work carried out can be reliably logged.

The sensor unit can be designed to monitor the adjustment path, the pulling or pressing forces, the torque or the like, which is required for carrying out the work processes and their successful completion. According to a particularly advantageous embodiment of the invention, the control unit is provided with a display, which makes it particularly easy for the operating personnel to operate the hand-held pulling and compressing device. Furthermore, this can also be connected to a central database via suitable wireless transmission means.

Figure 2:
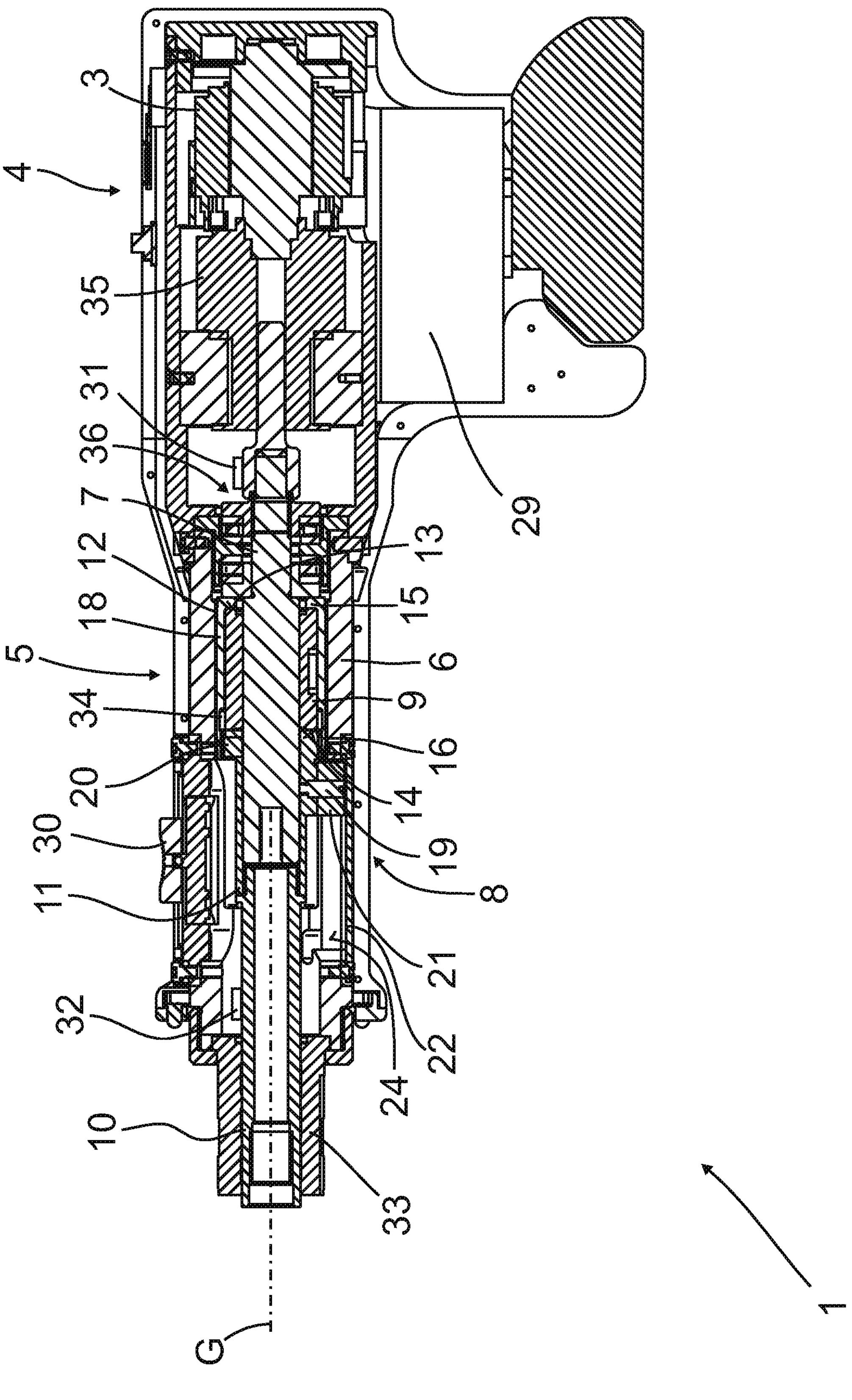
Figure 3:
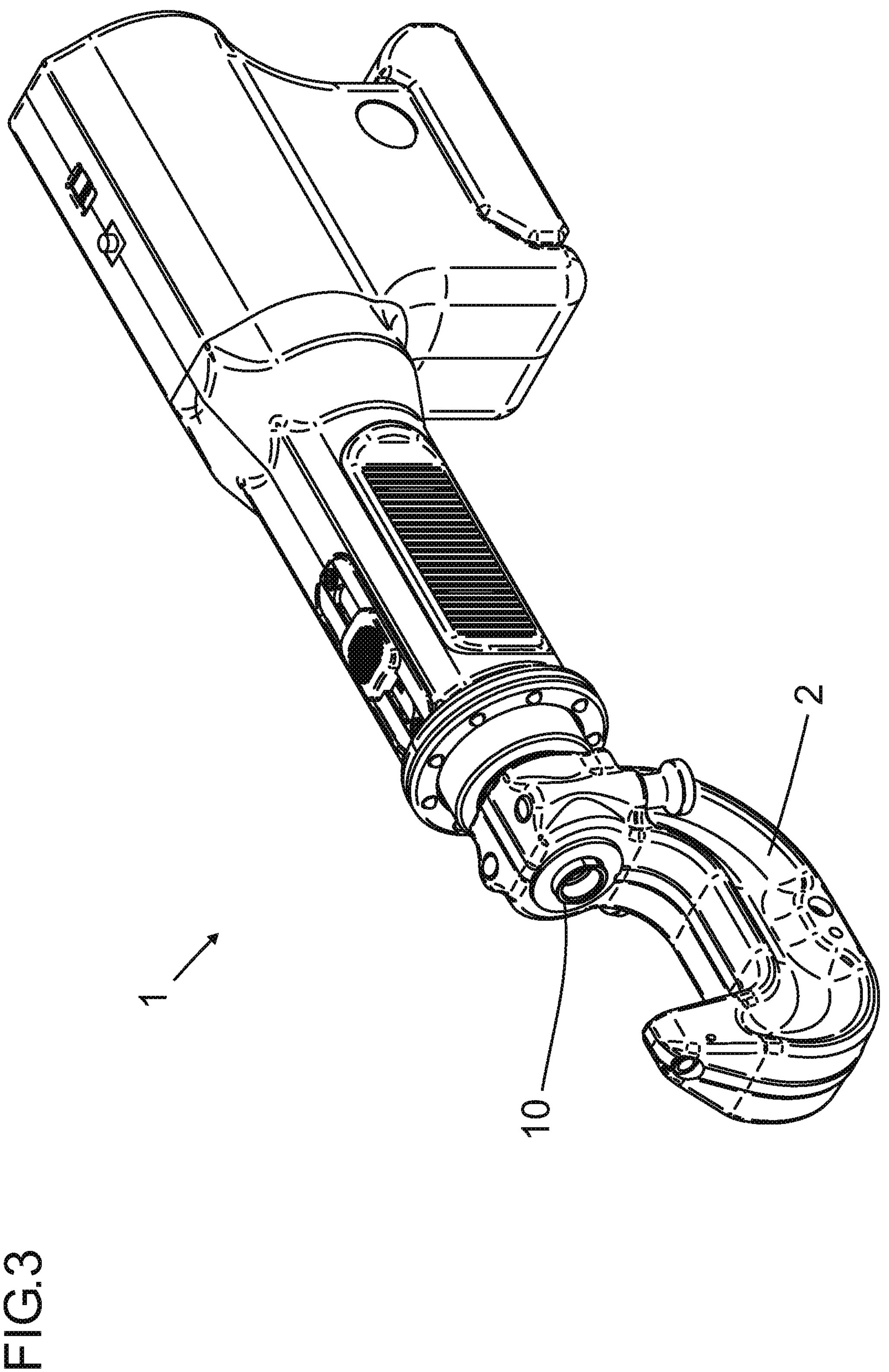
Figure 4:
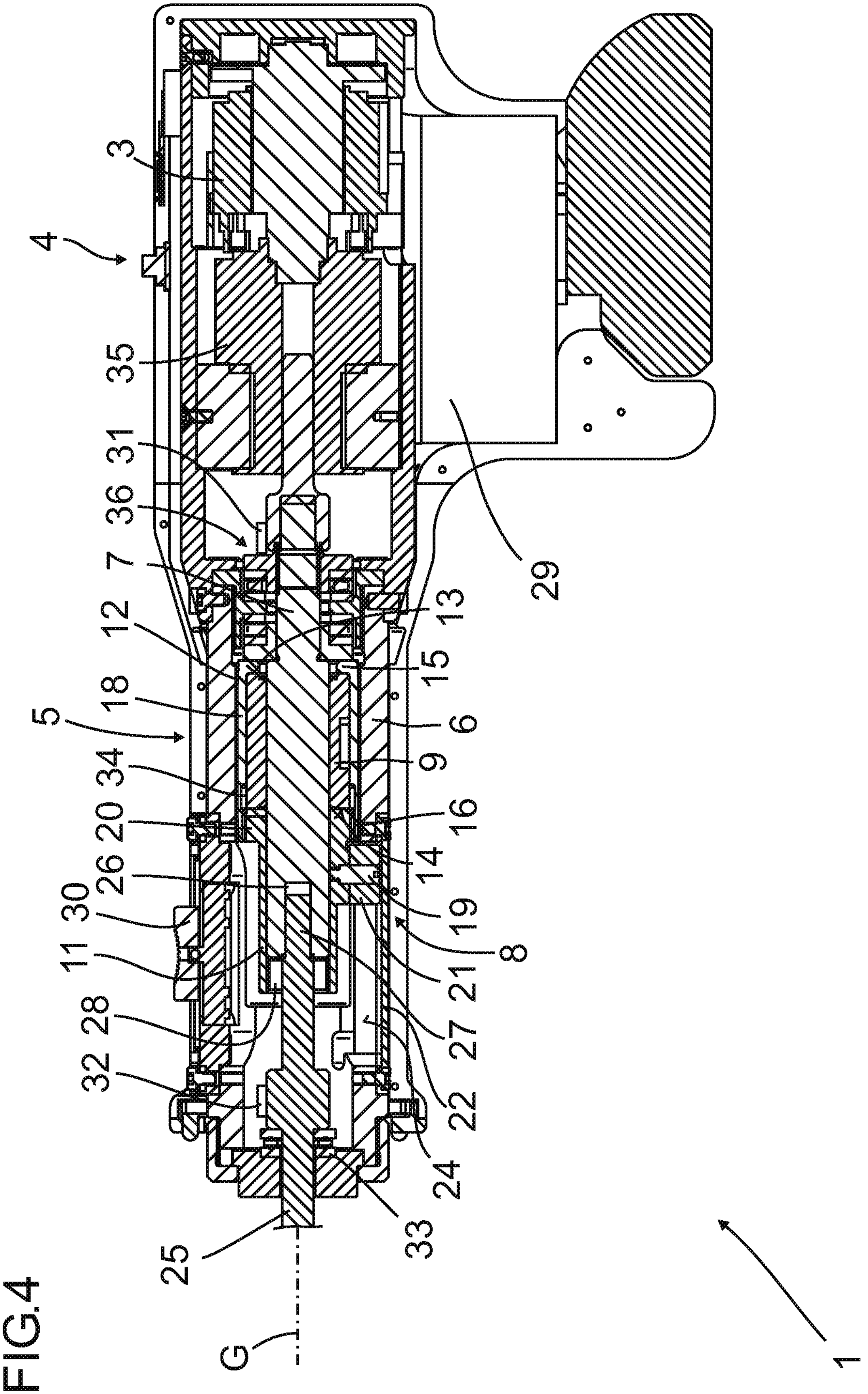

An embodiment of the invention is explained below with reference to the drawings. The drawings show:

FIG. 1 a perspective view of a hand-held pulling and compressing device with a first tool holder;

FIG. 2 a sectional view of the pulling and compressing device of FIG. 1;

FIG. 3 a perspective view of the pulling and compressing device of FIGS. 1 and 2 with a connected rivet clamp;

FIG. 4 a sectional view of the pulling and compressing device of FIGS. 1-3 with a second tool holder.

FIG. 1 shows a perspective view of a pulling and compressing device 1 with a drive unit 4 comprising an electric motor 3 and a gear 35 connected to the electric motor 3. A threaded spindle 7 of a screw drive 5 connected to the gear 35 is driven by means of the electric motor 3 via the gear 35, the threaded spindle 7 being rotatably mounted in a bearing seat 36 of a housing body 6 (see FIG. 2).

In addition to the threaded spindle 7, the screw drive 5 also has a threaded nut 9 arranged on the threaded spindle 7 and mounted non-rotatably on the housing body 6. The threaded nut 9 serves to drive a first tool holder designed as a piston rod 10, which is adjustably mounted in a bearing seat 33 in the longitudinal axis direction of the threaded spindle 7, i.e. in the direction of the threaded spindle axis G, so that punch riveting operations can be carried out by means of the pulling and compressing device 1 via a connected rivet clamp 2 (see FIG. 3).

The piston rod 10 is connected to the threaded nut 9 via a detachably connected coupling unit 11, which bears against a second end face 14 of the threaded nut 9 at its end opposite the piston rod 10. To prevent rotation of the coupling unit 11 relative to the threaded nut 9, the coupling unit 11 also has projections 34 on its contact surface with the second end face 14 of the threaded nut 9, which engage in recesses on the second end face 14 of the threaded nut 9.

A connecting element 12 is used to transmit the linear movement generated by the threaded nut 9 to the coupling unit 11. This has a first connecting section 15 bearing against the first end face 13 of the threaded nut 9 facing the gear 35 and a second connecting section 16 engaging with a coupling section 20 of the coupling unit 11. The latter is arranged to project beyond the second end face 14 of the threaded nut 9 in the direction of the threaded spindle axis G. The first and second connecting sections 15, 16 are connected to one another via a sleeve section 18, so that the connecting element 12 and the coupling unit 11 enclose the threaded nut 9 in a cage-like manner.

Compressive movements, i.e. adjusting movements of the threaded nut 9 in the direction of the piston rod 10, are transmitted to the coupling unit 11 via the direct contact of the coupling unit 11 with the second end face 14 of the threaded nut 9. To generate tensile forces as a result of a displacement of the threaded nut 9 in the direction of the drive unit 4, the compressive forces acting on the first connecting section 15 bearing against the first end face 13 of the threaded nut 9 are transmitted via the sleeve section 18 to the second connecting section 16, which is in engagement with the coupling section 20 of the coupling unit 11, so that the compressive forces are converted into tensile forces there.

A bearing unit 8, which is attached to the coupling unit 11, serves to secure the threaded nut 9 against rotation on the housing body 6. The coupling unit 11 has a bearing journal 19 aligned perpendicular to the threaded spindle axis G and projecting from the coupling unit 11, on which a bearing roller 21 is rotatably arranged. The bearing roller 21 is supported by two sections arranged adjacent to the threaded spindle axis G in the form of two parallel inner surfaces 24 of a guide designed as an elongated hole 22, so that the bearing roller 21 rolls on the inner surfaces 24 during an adjusting movement of the threaded nut 9 in the direction of the threaded spindle axis G. The housing body 6 is formed in one piece from a metal material and the elongated hole 22 extends in the direction of the threaded spindle axis G. The bearing unit 8 and thus also the threaded nut 9 via the non-rotable connection of the coupling unit 11 to the threaded nut 9 are supported on the housing body 6.

As shown in FIG. 4, the screw drive 5 is designed to transmit rotational movements of the threaded spindle 7 to a second tool holder 25. A recess 26 is arranged on the threaded spindle 7 in order to form a positive fit in the circumferential direction of the threaded spindle axis G with a shaped section 27 arranged on the second tool holder 25. The shaped section 27 and the recess 26 each have a polygon-shaped cross-section extending in the direction of the threaded spindle axis G. The coupling unit 11 has a sleeve-like design, i.e. the coupling unit 11 has a free area formed as a through opening 28 for the second tool holder 25 to pass through.

A control unit 29 for controlling and/or archiving the operating processes is also arranged on the hand-held pulling and compressing device 1. The control unit 29 is connected to an actuating element 30 and a rotation sensor 31 for detecting the torque of the electric motor 3 and a force sensor 32 for detecting the tensile and compressive forces of the piston rod 10.

To arrange the second tool holder 25 on the threaded spindle 7, the piston rod 10 is first released from the coupling unit 11 and removed from the housing base body 6 in the direction of the threaded spindle axis G. The second tool holder 25 is then pushed into the housing body 6 in the direction of the threaded spindle axis G, guided through the through opening 28 of the coupling unit 11 and the shaped section 27 is connected to the recess 26 to form a positive fit with the threaded spindle 7.

All the features explained in connection with individual embodiments of the invention may be provided in different combinations for the hand-held pulling and compressing device in order to realize their advantageous effects, even if these have been described for different embodiments.

The scope of protection of the present invention is given by the claims and is not limited by the features explained in the description or shown in the figures.

LIST OF REFERENCE SYMBOLS

1 pulling and compressing device
2 rivet clamp
3 electric motor
4 drive unit
screw drive
6 housing body
7 threaded spindle
8 bearing unit
9 threaded nut
first tool holder/piston rod
11 coupling unit
12 connecting element
13 first end face (threaded nut)
14 second end face (threaded nut)
15 first connecting section (connecting element)
16 second connecting section (connecting element)
18 sleeve section (connecting element)
19 bearing journal
20 coupling section (coupling unit)
21 bearing roller (one roller)
22 elongated hole/guide
24 inner surface/section of the housing base body
25 second tool holder
26 recess
27 shaped section
28 through opening/free area
29 control unit
30 actuating element
31 rotation sensor
32 force sensor
33 bearing seat
34 head start
35 gear
36 bearing seat
G threaded spindle axis

The invention claimed is:

1. Hand-held pulling and compressing device for driving interchangeable tools, with a drive unit comprising a battery-operated electric motor,
a screw drive with a threaded spindle connected to the electric motor and mounted rotatably on a housing body, and a threaded nut mounted rotatably on the threaded spindle and non-rotatably on the housing body via a bearing unit, and
a coupling unit connected to a first tool holder for transmitting tensile and compressive forces resulting from the direction of rotation of the threaded spindle from the threaded nut to the first tool holder, wherein the screw drive is designed to transmit rotational movements of the threaded spindle to a second tool holder.

2. Hand-held pulling and compressing device according to claim 1, characterized by a connecting element for transmitting tensile and compressive forces from the threaded nut to the coupling unit, the connecting element being operatively connected to a first end face of the threaded nut via a first connecting section and to the coupling unit via a second connecting section.

3. Hand-held pulling and compressing device according to claim 2, characterized in that the first connecting section of the connecting element bears against the first end face and the second connecting section projects beyond a second end face of the threaded nut in the longitudinal axis direction of the threaded spindle and is in engagement with a coupling section of the coupling unit.

4. Hand-held pulling and compressing device according to claim 1, wherein the coupling unit is designed in such a way that the second tool holder can be connected to the threaded spindle.

5. Hand-held pulling and compressing device according to claim 1, wherein the coupling unit is connected non-rotatably to the threaded nut.

6. Hand-held pulling and compressing device according to claim 1, wherein the bearing unit is designed in such a way that the threaded nut and/or the coupling unit connected non-rotatably to the threaded nut are supported on the housing body in a rolling manner.

7. Hand-held pulling and compressing device according to claim 1, wherein the first tool holder is designed for detachable connection to the coupling unit and/or the second tool holder is designed for detachable connection to the threaded spindle.

8. Hand-held pulling and compressing device according to claim 1, wherein the threaded spindle and/or the second tool holder are designed to form a positive fit in the circumferential direction of the threaded spindle.

9. Hand-held pulling and compressing device according to claim 1, wherein the drive unit has a gear connecting the electric motor and the threaded spindle.

10. Hand-held pulling and compressing device according to claim 1, characterized by a control unit connected to at least one sensor unit for controlling and/or archiving the operating processes.

11. Hand-held pulling and compressing device for driving interchangeable tools, with a drive unit comprising a battery-operated electric motor,
a screw drive with a threaded spindle connected to the electric motor and mounted rotatably on a housing body, and a threaded nut mounted rotatably on the threaded spindle and non-rotatably on the housing body via a bearing unit, and
a coupling unit connected to a first tool holder for transmitting tensile and compressive forces resulting from the direction of rotation of the threaded spindle from the threaded nut to the first tool holder, wherein the screw drive is designed to transmit rotational movements of the threaded spindle to a second tool holder, the device further comprising a connecting element for transmitting tensile and compressive forces from the threaded nut to the coupling unit, the connecting element being operatively connected to a first end face of the threaded nut via a first connecting section and to the coupling unit via a second connecting section.

12. Hand-held pulling and compressing device for driving interchangeable tools, with a drive unit comprising a battery-operated electric motor, a screw drive with a threaded spindle connected to the electric motor and mounted rotatably on a housing body, and a threaded nut mounted rotatably on the threaded spindle and non-rotatably on the housing body via a bearing unit, and a coupling unit connected to a first tool holder for transmitting tensile and compressive forces resulting from the direction of rotation of the threaded spindle from the threaded nut to the first tool holder, wherein the screw drive is designed to transmit rotational movements of the threaded spindle to a second tool holder, the device further comprising a control unit connected to at least one sensor unit for controlling and/or archiving the operating processes.

* * * * *